United States Patent
Cotrel et al.

[11] 3,862,149
[45] Jan. 21, 1975

[54] PYRROLO (3,4-B) PYRAZINE DERIVATIVES

[75] Inventors: Claude Cotrel, Val-de-Marne; Claude Jeanmart; Mayer Naoum Messer, both of Essonne, all of France

[73] Assignee: Rhone-Poulenc S.A., Paris, France

[22] Filed: Dec. 29, 1972

[21] Appl. No.: 319,876

[30] Foreign Application Priority Data
Jan. 7, 1972 France .............................. 72.00505
Nov. 9, 1972 France .............................. 72.39731

[52] U.S. Cl. ................ 260/268 BQ, 260/268 BC, 260/268 C, 424/250
[51] Int. Cl. ............................................ C07d 51/72
[58] Field of Search .... 260/268 C, 268 BC, 268 BQ

*Primary Examiner*—Donald G. Daus
*Assistant Examiner*—Jose Tovar
*Attorney, Agent, or Firm*—Stevens, Davis, Miller & Mosher

[57] ABSTRACT

The new compounds of the formula:

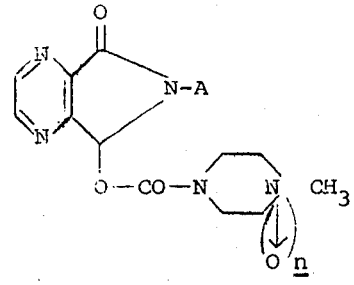

wherein A is a phenyl, pyridyl, pyridazinyl or 2-, 3- or 4-quinolyl radical optionally substituted by halogen, alkyl of 1 through 4 carbon atoms, alkoxy of 1 through 4 carbon atoms, cyano and nitro, and $n$ is zero or 1, possess pharmacological properties, and are particularly active as tranquillisers and anti-convulsant agents.

9 Claims, No Drawings

PYRROLO (3,4-b) PYRAZINE DERIVATIVES

This invention relates to new therapeutically useful pyrrolo[3,4-b]pyrazine derivatives, processes for their preparation and pharmaceutical compositions containing them.

The new pyrrolo[3,4-b]pyrazine derivatives of the present invention are those of the general formula:

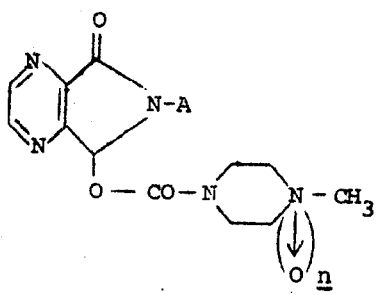

I wherein A represents a phenyl, pyridyl, pyridazinyl or 2-, 3- or 4-quinolyl radical, each such radical being optionally substituted by at least one atom or radical selected from halogen (e.g. chlorine) atoms, alkyl radicals containing from 1 to 4 carbon atoms (e.g. methyl), alkoxy radicals containing from 1 to 4 carbon atoms (e.g. methoxy), and cyano and nitro radicals, and $n$ is zero or 1. When the radical A carries two or more substituents, the substituents may be identical or different.

According to a feature of the invention, the compounds of general formula I, wherein A is as hereinbefore defined and $n$ is zero, are prepared by the process which comprises reacting 1-chlorocarbonyl-4-methylpiperazine with an alkali metal salt, optionally prepared in situ, of a pyrrolo[3,4-b]pyrazine derivative of the general formula:

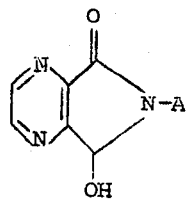

II wherein A is as hereinbefore defined. The reaction is generally carried out in an anhydrous organic solvent, for example dimethylformamide, at a temperature below 50°C.

The pyrrolo[3,4-b]pyrazine derivatives of general formula II can be obtained by the partial reduction of an imide of the general formula:

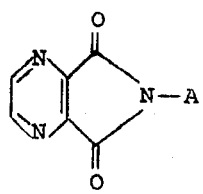

III wherein A is as hereinbefore defined. The reduction is generally carried out by means of an alkali metal borohydride in aqueous organic solution, e.g. in aqueous dioxan.

The imides of general formula III can be obtained by cyclisation of a pyrazine-2,3-dicarboxylic acid derivative of the general formula:

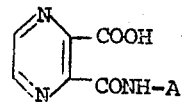

IV wherein A is as hereinbefore defined. The cyclisation reaction is generally carried out by heating the pyrazine-2,3-dicarboxylic acid derivative in refluxing thionyl chloride.

The pyrazine-2,3-dicarboxylic acid derivatives of general formula IV can be obtained by reacting an amine of the general formula:

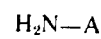

$H_2N—A$

V (wherein A is as hereinbefore defined) with pyrazine-2,3-dicarboxylic acid anhydride. The reaction is generally carried out by heating the reactants in an organic solvent, for example acetonitrile.

Pyrazine-2,3-dicarboxylic acid anhydride can be prepared according to the method described by S. Gabriel and A. Sonn, Chem. Ber., 40, 4850 (1907).

According to a further feature of the invention, compounds of general formula I, wherein A is as hereinbefore defined and $n$ is zero, are prepared by the process which comprises reacting 1-methylpiperazine with a mixed carbonate of the general formula:

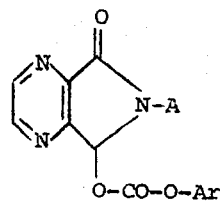

VI wherein A is as hereinbefore defined and Ar represents a phenyl radical optionally substituted by, for example, an alkyl radical containing 1 to 4 carbon atoms. The reaction is generally carried out in an inert organic solvent, for example acetonitrile or acetone, at a temperature between 0° and 50°C.

The mixed carbonates of general formula VI can be obtained by reacting a chloroformate of the general formula:

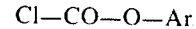

Cl—CO—O—Ar

VII (wherein Ar is as hereinbefore defined) with a pyrrolo[3,4-b]pyrazine derivative of general formula II. The reaction is generally carried out in a basic organic solvent, for example pyridine, and at a temperature preferably between 5° and 60°C.

According to another feature of the invention, the compounds of general formula I, wherein A is as hereinbefore defined and $n$ is 1, are prepared by the process which comprises oxidising a corresponding compound of general formula I, wherein A is as hereinbefore defined and $n$ is zero, by methods known per se for the N-oxidation of the piperazine nucleus. The oxidation is generally carried out by means of a peracid, for example p-nitroperbenzoic acid, in an organic solvent, for example chloroform, and at a temperature of about 20°C.

The pyrrolo[3,4-b]pyrazine derivatives of general formula I obtained by the aforementioned processes can be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The pyrrolo[3,4-b]pyrazine derivatives of general formula I, when the significances of the symbols A and n make it possible, may be converted by methods known per se into acid addition salts. The acid addition salts may be obtained by the action of acids on the new compounds in appropriate solvents. As organic solvents there may be used alcohols, ethers, ketones or chlorinated hydrocarbons. The salt which is formed is precipitated, if necessary after concentration of the solution, and is isolated by filtration or decantation.

By the term "methods known per se" as used in this specification is meant methods heretofore used or described in the chemical literature.

The pyrrolo[3,4-b]pyrazine derivatives of the invention and their acid addition salts possess valuable pharmacological properties; they are particularly active as tranquillisers and anticonvulsant agents. In animals (mice) they have proved active as such at doses of between 10 and 100 mg./kg. animal body weight when administered orally, in particular in the following tests:

i. electric battle test according to a technique similar to that of Tedeschi et al. [J. Pharmacol., 125, 28 (1959)],
ii. convulsion with pentetrazole according to a technique similar to that of Everett and Richards [J. Pharmacol., 81, 402 (1944)],
iii. supramaximal electroshock according to the technique of Swinyard et al. [J. Pharmacol., 106, 319 (1952)], and
iv. locomotor activity according to the technique of Courvoisier [Congres de Medecins Alienistes et Neurologistes — Tours — (8/13th June, 1959)] and Julou (Bulletin de la Societe de Pharmacie de Lille, No. 2, January, 1967, page 7).

Preferred pyrrolo[3,4-b]pyrazine derivatives of the invention are those of general formula I wherein the radical A represents a phenyl, pyridyl, pyridazinyl or 2-, 3- or 4-quinolyl radical optionally substituted by a halogen (preferably chlorine) atom, alkyl radical containing 1 to 4 carbon atoms (preferably methyl) or a nitro radical, and more particularly a halogeno-pyridyl (e.g. 5-chloropyrid-2-yl), nitrophenyl (e.g. 3-nitrophenyl), alkyl-pyridazinyl (e.g. 6-methylpyridazin-3-yl) or halogenoquinolyl (e.g. 7-chloroquinol-2-yl) radical. Of outstanding importance is 6-(5-chloropyrid-2-yl)-5-(4-methylpiperazin-1-yl)carbonyloxy-7-oxo-5,6-dihydropyrrolo[3,4-b]pyrazine.

For therapeutic purposes, the pyrrolo[3,4-b]pyrazine derivatives of general formula I may be employed as such or, when appropriate, in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllinacetates, salicylates, phenolphthalinates and methylene-bis-β-hydroxynapthoates) so that the beneficial physiological properties inherent in the bases are not vitiated by side effects ascribable to the anions.

The following Examples illustrate the invention.

EXAMPLE 1

A solution of 6-(5-chloropyrid-2-yl)-5-hydroxy-7-oxo-5,6-dihydropyrrolo[3,4-b]pyrazine (12 g.) in anhydrous dimethylformamide (360 cc.) is added to a suspension of sodium hydride (50% dispersion in mineral oil) (2.4 g.) in anhydrous dimethylformamide (60 cc.), whilst maintaining the temperature at about −10°C. When the evolution of gas has ceased, a solution of 1-chlorocarbonyl-4-methylpiperazine (8.1 g.) in anhydrous dimethylformamide (20 cc.) is added, whilst maintaining the temperature at about −10°C. The reaction mixture is stirred for a further 3 hours whilst allowing it to heat up gradually to a temperature of about 20°C., and then it is poured into ice-water (1,540 cc.). The product which crystallises is filtered off, washed with water (150 cc.) and then with diisopropyl ether (100 cc.). After drying, a product (13.5 g.), melting at 140°C., is obtained and is dissolved in ethyl acetate (600 cc.). The solution obtained is filtered through silica gel (250 g.) contained in a column 4.2 cm. in diameter. Elution is then carried out with ethyl acetate (3,200 cc.) followed by a mixture of ethyl acetate and methanol (19–1 by volume; 400 cc.). All these eluates are discarded. Elution is then carried out with a mixture of ethyl acetate and methanol (9–1 by volume; 800 cc.) followed by a mixture of ethyl acetate and methanol (4–1 by volume; 800 cc.). These eluates are combined and concentrated to dryness under reduced pressure. A product (11.8 g.) melting at 170°C., is thus obtained. On recrystallisation from a mixture of acetonitrile and diisopropyl ether (1–1 by volume; 190 cc.), 6-(5-chloropyrid-2-yl)-5-(4-methylpiperazin-1-yl)-carbonyloxy-7-oxo-5,6-dihydropyrrolo[3,4-b]-pyrazine (8.3 g.), which melts at 178°C., is obtained.

6-(5-Chloropyrid-2-yl)-5-hydroxy-7-oxo-5,6-dihydropyrrolo[3,4-b]pyrazine employed as starting material can be prepared by adding potassium borohydride (1.85 g.), with vigorous stirring and whilst maintaining the temperature at about 13°C., to a suspension of 6-(5-chloropyrid-2-yl)-5,7-dioxo-5,6-dihydropyrrolo[3,4-b]-pyrazine (12 g.) in a mixture of dioxan and water (19–1 by volume; 120 cc.). After stirring for 6 minutes, the reaction mixture is poured into water (600 cc.) and then neutralised with acetic acid (6 cc.). The product which crystallises is filtered off and then washed with water (30 cc.). After drying, a product (8.5 g.), melting at 245°C., is obtained, which is suspended in chloroform (80 cc.). After stirring for half an hour at a temperature of about 20°C., the insoluble product is filtered off and then washed with chloroform (30 cc.). After drying, 6-(5-chloropyrid-2-yl)-5-hydroxy-7-oxo-5,6 -dihydropyrrolo-[3,4-b]pyrazine (7.7 g.), which melts at 242°C., is obtained.

6-(5-Chloropyrid-2-yl)-5,7-dioxo-5,6-dihydropyrrolo[3,4-b]pyrazine can be prepared by gradually heating a suspension of 3-(5-chloropyrid-2-yl)carbamoylpyrazine-2-carboxylic acid (100 g.) in thionyl chloride (500 cc.) to the reflux temperature. When the evolution of gas has ceased, the solution obtained is evaporated to dryness under reduced pressure. The resulting residue is treated with diethyl ether (250 cc.) and the insoluble product is filtered off. After drying, a product (91 g.), melting at 236°C., is obtained, which is suspended in water (910 cc.) and chloroform (3,800 cc.). After stirring for 1 hour at a temperature of about 20°C., a small amount of insoluble material is filtered off. The organic layer is decanted, dried over sodium sulphate and then concentrated to dryness under reduced pressure to yield 6-(5-chloropyrid-2-yl)-5,7-dioxo-5,6-dihydropyrrolo[3,4-b]pyrazine (72 g.) melting at 237°C.

3-(5-Chloropyrid-2-yl)carbamoylpyrazine-2-carboxylic acid can be prepared by heating a suspension of 2-amino-5-chloropyridine (100 g.) and pyrazine-2,3-dicarboxylic acid anhydride (58.5 g.) in acetonitrile (1,170 cc.) at the reflux temperature for one and a half hours. After cooling, the insoluble product is filtered off and then washed with acetonitrile (350 cc.). After drying, a product (164 g.), melting at 165°C., is obtained and is suspended in water (350 cc.). This suspension is acidified to pH 1 by the addition of N hydrochloric acid (330 cc.) and the insoluble product is filtered off and then washed with water (75 cc.). After drying, 3-(5-chloropyrid-2-yl)carbamoylpyrazine-2-carboxylic acid (100.9 g.), which melts at 222°C., is obtained.

Pyrazine-2,3-dicarboxylic acid anhydride can be prepared according to the method described by S. Gabriel and A. Sonn, Chem. Ber., 40, 4850 (1907).

2-Amino-5-chloropyridine can be prepared according to the method described by F. Friedrick et coll, Pharmazie, 19 (10), 677 (1964).

EXAMPLE 2

Following the procedure of Example 1 but starting with 5-hydroxy-6-(3-nitrophenyl)-7-oxo-5,6-dihydropyrrolo[3,4-b]pyrazine (2.2 g.) and 1-chlorocarbonyl-4-methylpiperazine (1.45 g.), 5-(4-methylpiperazin-1-yl)-carbonyloxy-6-(3-nitrophenyl)-7-oxo-5,6-dihydropyrrolo-[3,4-b]pyrazine (2 g.), which melts at 182°C., after recrystallisation from ethyl acetate, is obtained.

5-Hydroxy-6-(3-nitrophenyl)-7-oxo-5,6-dihydropyrrolo[3,4-b]pyrazine, m.p. 264°C., employed as starting material can be prepared by reacting potassium borohydride with 6-(3-nitrophenyl)-5,7-dioxo-5,6-dihydropyrrolo[3,4-b]pyrazine in a mixture of dioxan and water (95-5 by volume).

6-(3-Nitrophenyl)-5,7-dioxo-5,6-dihydropyrrolo-[3,4-b]pyrazine, which melts at 280°C., can be prepared by reacting excess thionyl chloride with 3-(3-nitrophenyl)carbamoylpyrazine-2-carboxylic acid.

3-(3-Nitrophenyl)carbamoylpyrazine-2-carboxylic acid, which melts at 215°C., can be prepared by reacting 3-nitroaniline with pyrazine-2,3-dicarboxylic acid anhydride in refluxing acetonitrile.

EXAMPLE 3

1-Methylpiperazine (155 g.) is added to a suspension of 6-(5-chloropyrid-2-yl)-7-oxo-5-phenoxycarbonyloxy-5,6-dihydropyrrolo[3,4-b]pyrazine (194 g.) in acetone (970 cc.) cooled to a temperature of about 3°C. The reaction mixture is stirred for 3 hours at a temperature of about 3°C. and is then poured into water (5,000 cc.). The product which precipitates is filtered off and then washed with water (600 cc.). After drying, a product (162.4 g.), melting at about 135°C., is obtained. This product is treated with methylene chloride (1,100 cc.) at a temperature of about 20°C. The insoluble material is filtered off and then the filtrate is washed with N sodium hydroxide solution (3 × 200 cc.) and with water (3 × 200 cc.). The organic phase is treated with decolourising charcoal (10 g.), dried over potassium carbonate, filtered and then concentrated to dryness under reduced pressure. The oily residue obtained is dissolved in boiling acetonitrile (500 cc.). The product which crystallises on cooling is filtered off, washed with ice-cold acetonitrile (50 cc.) and then with diisopropyl ether (50 cc.). After drying, 6-(5-chloropyrid-2-yl)-5-(4-methylpiperazin-1-yl) carbonyloxy-7-oxo-5,6-dihydropyrrolo[3,4-b]-pyrazine (101 g.), which melts at 178°C., is obtained.

6-(5-Chloropyrid-2-yl)-7-oxo-5-phenoxycarbonyloxy-5,6-dihydropyrrolo[3,4-b]pyrazine employed as starting material can be prepared by adding phenyl chloroformate (141 g.) to a suspension of 6-(5-chloropyrid-2-yl)-5-hydroxy-7-oxo-5,6-dihydropyrrolo[3,4-b]pyrazine (158 g.) in anhydrous pyridine (1,580 cc.), with stirring and whilst maintaining the temperature at about 5°C. When the addition is complete, the reaction mixture is heated to a temperature of about 60°C. Heating is continued for 1 hour. After cooling the reaction mixture to a temperature of about 20°C., water (4,750 cc.) is added. The product which crystallises is filtered off and washed with water (2 × 250 cc.), followed by acetonitrile (150 cc.) and diisopropyl ether (250 cc.). After drying, 6-(5-chloropyrid-2-yl)-7-oxo-5-phenoxycarbonyloxy-5,6-dihydropyrrolo[3,4-b]pyrazine (169 g.), melting at 193°C., is obtained.

6-(5-Chloropyrid-2-yl)-5-hydroxy-7-oxo-5,6-dihydropyrrolo[3,4-b]pyrazine can be prepared as described in EXAMPLE 1.

EXAMPLE 4

Following the procedure of Example 3 but starting with 6-(6-methylpyridazin-3-yl)-7-oxo-5-phenoxycarbonyloxy-5,6-dihydropyrrolo[3,4-b]pyrazine (5.7 g.) and 1-methylpiperazine (3.15 g.), 5-(4-methylpiperazin-1-yl)carbonyloxy-6-(6-methylpyridazin-3-yl)-7-oxo-5,6-dihydropyrrolo[3,4-b]pyrazine (1.7 g.), which melts at 233°C., is obtained.

6-(6-Methylpyridazin-3-yl)-7-oxo-5-phenoxycarbonyloxy-5,6-dihydropyrrolo[3,4-b]pyrazine, m.p. 180°C., employed as starting material can be prepared by reacting phenyl chloroformate with 5-hydroxy-6-(6-methylpyridazin-3-yl)-7-oxo-5,6-dihydropyrrolo[3,4-b]-pyrazine in anhydrous pyridine at a temperature of about 45°C.

5-Hydroxy-6-(6-methylpyridazin-3-yl)-7-oxo-5,6-dihydropyrrolo[3,4-b]pyrazine, which melts at 268°C., can be prepared by reacting potassium borohydride with 6-(6-methylpyridazin-3-yl)-5,7-dioxo-5,6-dihydropyrrolo-[3,4-b]pyrazine in a mixture of dioxan and water (95–5 by volume) at a temperature of about 20°C.

6-(6-Methylpyridazin-3-yl)-5,7-dioxo-5,6-dihydropyrrolo[3,4-b]pyrazine can be prepared by adding 3-amino-6-methylpyridazine (10.9 g.) to a suspension of pyrazine-2,3-dicarboxylic acid anhydride (15 g.) in acetic anhydride (150 cc.), whilst maintaining the temperature at about 25°C. When the addition is complete, the reaction mixture is heated for 15 minutes at a temperature of about 125°C. After cooling, the product which has crystallised is filtered off and then washed with acetic anhydride (10 cc.) and diisopropyl ether (90 cc.). After drying, 6-(6-methylpyridazin-3-yl)-5,7- dioxo-5,6-dihydropyrrolo[3,4-b]pyrazine (18.1 g.), melting at 281 C., is obtained.

3-Amino-6-methylpyridazine can be prepared according to the method described by W. G. Overend and L. F. Wiggins, J. Chem. Soc., p 239 (1947).

EXAMPLE 5

Following the procedure of Example 3 but starting with 6-(7-chloroquinol-2-yl)-7-oxo-5-phenoxycarbonyloxy-5,6-dihydropyrrolo[3,4-b]pyrazine (4 g.) and 1-methylpiperazine (1.8 g.), 6-(7-chloroquinol-2-yl)-5-(4-methylpiperazin-1-yl)carbonyloxy-7-oxo-5,6-dihydropyrrolo[3,4-b]pyrazine 1.9 g.), which melts at 247°–248°C., is obtained.

6-(7-Chloroquinol-2-yl)-7-oxo-5-phenoxycarbonyloxy-5,6-dihydropyrrolo[3,4-b]pyrazine, m.p. 242°C., employed as starting material can be prepared by reacting phenyl chloroformate with 6-(7-chloroquinol-2-yl)-5-hydroxy-7-oxo-5,6-dihydropyrrolo[3,4-b]pyrazine in anhydrous pyridine at a temperature of about 60°C.

6-(7-Chloroquinol-2-yl)-5-hydroxy-7-oxo-5,6-dihydropyrrolo[3,4-b]pyrazine, melting at 256°–257°C., can be prepared by reacting potassium borohydride with 6-(7-chloroquinol-2-yl)-5,7-dioxo-5,6-dihydropyrrolo[3,4-b]-pyrazine in a mixture of dioxan and water (95–5 by volume) at a temperature of about 20°C.

6-(7-Chloroquinol-2-yl)-5,7-dioxo-5,6-dihydropyrrolo[3,4-b]pyrazine, melting at 253°C., can be prepared by reacting pyrazine-2,3-dicarboxylic acid anhydride with 2-amino-7-chloroquinoline in acetic anhydride at a temperature of about 130°C.

2-Amino-7-chloroquinoline can be prepared by heating a mixture of 2,7-dichloroquinoline (36.7 g.) and 16N ammonia solution (700 cc.) in an autoclave at 125°C., for 25 hours. After cooling, an insoluble product is filtered off and then washed with water (120 cc.). After drying, a product (34 g.), melting at about 115°–120°C., is obtained. On recrystallisation from benzene (150 cc.), 2-amino-7-chloroquinoline (10 g.), which melts at 175°C., is obtained.

2,7-Dichloroquinoline can be prepared according to the method described by R. E. Lutz et coll, J. Amer. Chem. Soc., 68, 1322 (1946).

EXAMPLE 6

A solution of 6-(5-chloropyrid-2-yl)-5-(4-methylpiperazin-1-yl)carbonyloxy-7-oxo-5,6-dihydropyrrolo-[3,4-b]pyrazine (23.3 g.) in chloroform (180 cc.) is added to a suspension of p-nitroperbenzoic acid (13.2 g.) in chloroform (660 cc.), whilst maintaining the temperature at about 20°C. The reaction mixture is then stirred for 4 hours at a temperature of about 20°C. and then a 5% (w/v) aqueous solution of sodium bicarbonate (300 cc.) is added. The insoluble product is filtered off and then washed three times with chloroform (total 90 cc.) and three times with water (total 90 cc.). This product is taken up in chloroform (500 cc.) and the suspension obtained is then heated under reflux for 1 hour. An insoluble product (16.1 g.) is isolated by hot filtration, and washed with boiling chloroform (50 cc.). The cooled filtrate is filtered through alumina (120 g.) contained in a column 3 cm. in diameter. Elution is then carried out successively with pure chloroform (700 cc.), pure methylene chloride (240 cc.) and a mixture of methylene chloride and methanol (99–1 by volume; 240 cc.). All these eluates are discarded. Elution is then carried out with a mixture of methylene chloride and methanol (98–2 by volume; 840 cc.) and this eluate is concentrated to dryness under reduced pressure. The residue obtained is dissolved in boiling chloroform (90 cc.) and then the solution obtained is cooled. Diethyl ether (90 cc.) is added to it and a slight amount of insoluble material is filtered off. Diethyl ether (a further 90 cc.) is added to the filtrate. The product which crystallises is filtered off and washed with diethyl ether (20 cc.). After drying, 4-[6-(5-chloropyrid-2-yl)-7-oxo-5,6-dihydropyrrolo[3,4-b]pyrazin-5-yl]oxycarbonyl-1-methylpiperazine 1-oxide (1.9 g.), which melts with decomposition at 185°–190°C., is obtained.

The present invention includes within its scope pharmaceutical compositions comprising, as active ingredient, at least one of the compounds of general formula I, or a non-toxic acid addition salt thereof, in association with a pharmaceutical carrier or coating. The invention includes especially such preparations made up for oral, parenteral or rectal administration or as ointments.

Solid compositions for oral administration include tablets, pills powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water or liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils such as olive oil, and injectable organic esters such as ethyl oleate. These compositions may also contain adjuvants such as preserving wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 50 mg. and 500 mg. of active substance per day. In general the physician will decide the posology considered appropriate, taking into account the age and weight and other factors intrinsic to the patient being treated.

The following Example illustrate pharmaceutical compositions according to the invention.

EXAMPLE 7

Tablets containing 25 mg. of active product and having the following composition are prepared in accordance with the usual technique:

| | |
|---|---|
| 6-(5-chloropyrid-2-yl)-5-(4-methylpiperazin-1-yl)-carbonyloxy-7-oxo-5,6-dihydropyrrolo[3,4-b]-pyrazine | 0.025 g. |
| starch | 0.090 g. |
| precipitated silica | 0.030 g. |
| magnesium stearate | 0.005 g. |

We claim:
1. A pyrrolo[3,4-b]pyrazine of the formula:

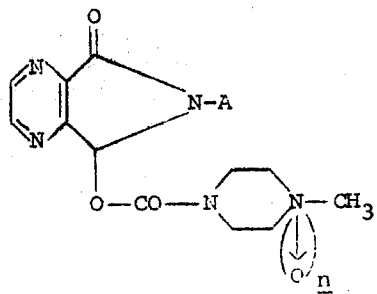

wherein A is a phenyl, pyridyl, pyridazinyl or 2-, 3-or 4-quinolyl radical, or a said radical substituted by a member of the class consisting of halogen, alkyl of 1 through 4 carbon atoms, and nitro, and n is zero or 1, or non-toxic acid addition salts thereof.

2. A pyrrolo[3,4-b]pyrazine according to claim 1 wherein n is zero.

3. A pyrrolo[3,4-b]pyrazine according to claim 1 wherein A is a halogeno-pyridyl, nitrophenyl, alkyl-pyridazinyl or halogeno-quinolyl radical.

4. A pyrrolo[3,4-pyrazine according to claim 1 wherein A is 5-chloropyrid-2-yl, 3-nitrophenyl, 6-methylpyridazin-3-yl or 7-chloroquinol-2-yl.

5. A compound selected from the class consisting of the pyrrolo[3,4-b]pyrazine according to claim 1 which is 6-(5-chloropyrid-2-yl)-5-(4-methylpiperazin-1-yl)carbonyloxy-7-oxo-5,6-dihydropyrrolo[3,4-b]pyrazine and non-toxic acid addition salts thereof.

6. A compound selected from the class consisting of the pyrrolo[3,4-b]pyrazine according to claim 1 which is 5-(4-methylpiperazin-1-yl)carbonyloxy-6-(3-nitrophenyl)-7-oxo-5,6-dihydropyrrolo[3,4-b]pyrazine and non-toxic acid addition salts thereof.

7. A compound selected from the class consisting of the pyrrolo[3,4-b]pyrazine according to claim 1 which is 5-(4-methylpiperazin-1-yl)carbonyloxy-6-(6-methylpyridazin-3-yl)-7-oxo-5,6-dihydropyrrolo[3,4-b]pyrazine and non-toxic acid addition salts thereof.

8. A compound selected from the class consisting of the pyrrolo[3,4-b]pyrazine according to claim 1 which is 6-(7-chloroquinol-2-yl)-5-(4-methylpiperazin-1-yl)carbonyloxy-7-oxo-5,6-dihydropyrrolo[3,4-b]pyrazine and non-toxic acid addition salts thereof.

9. A compound selected from the class consisting of the pyrrolo[3,4-b]pyrazine according to claim 1 which is 4-[6-(5-chloropyrid-2-yl)-7-oxo-5,6-dihydropyrrolo[3,4-b]-pyrazin-5-yl]oxycarbonyl-1-methylpiperazine 1-oxide and nontoxic acid addition salts thereof.

* * * * *